US012438477B2

(12) United States Patent
Watanabe et al.

(10) Patent No.: US 12,438,477 B2
(45) Date of Patent: Oct. 7, 2025

(54) PROTECTION CONTROL UNIT FOR AN INVERTER CONTROLLING CURRENT FLOW TO A HEAD CAPACITOR

(71) Applicant: MITSUBISHI HEAVY INDUSTRIES THERMAL SYSTEMS, LTD., Tokyo (JP)

(72) Inventors: Kyohei Watanabe, Tokyo (JP); Takayuki Takashige, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 344 days.

(21) Appl. No.: 17/437,657

(22) PCT Filed: Mar. 11, 2020

(86) PCT No.: PCT/JP2020/010436
§ 371 (c)(1),
(2) Date: Sep. 9, 2021

(87) PCT Pub. No.: WO2020/184598
PCT Pub. Date: Sep. 17, 2020

(65) Prior Publication Data
US 2022/0166345 A1    May 26, 2022

(30) Foreign Application Priority Data
Mar. 14, 2019  (JP) .................. 2019-047681

(51) Int. Cl.
*H02M 7/5387* (2007.01)
*F04D 27/00* (2006.01)
(Continued)

(52) U.S. Cl.
CPC ...... *H02M 7/53871* (2013.01); *F04D 27/008* (2013.01); *H02M 1/32* (2013.01); *H02P 27/06* (2013.01)

(58) Field of Classification Search
None
See application file for complete search history.

(56) References Cited

U.S. PATENT DOCUMENTS 8,605,471 B2 * 12/2013 Ogura ............... H02M 1/32
                                                363/56.05
9,450,523 B2 *  9/2016 Aiba ................ B60L 50/51
(Continued)

FOREIGN PATENT DOCUMENTS

JP      7-31001 A      1/1995
JP      H0731001    *  1/1995   ........... H02H 7/1216
(Continued)

OTHER PUBLICATIONS

Aoki et al., "Proposal for control method to suppress increase in DC voltage at emergency stop of inverter," 2012 Joint Conference of Electrical and Electronics Engineers in Hokuriku, A-72, 2012, 1 page total.

(Continued)

*Primary Examiner* — Philip E Stimpert
(74) *Attorney, Agent, or Firm* — Birch, Stewart, Kolasch & Birch, LLP

(57) ABSTRACT

A control device that includes an electric detection unit which detects an electric physical quantity relating to a head capacitor provided between a DC power supply and an inverter switching element; and a protection control unit which controls the inverter switching element in accordance with a change in the electric physical quantity so that no electric current flows to the head capacitor.

6 Claims, 10 Drawing Sheets

(51) Int. Cl.
*H02M 1/32* (2007.01)
*H02P 27/06* (2006.01)

(56) References Cited

U.S. PATENT DOCUMENTS

| | | | |
|---|---|---|---|
| 9,531,309 B2* | 12/2016 | Nakao | H02P 27/08 |
| 2011/0050136 A1* | 3/2011 | Sumi | B60L 53/20 |
| | | | 318/400.3 |
| 2013/0342139 A1* | 12/2013 | Shimomugi | H02P 27/00 |
| | | | 318/400.3 |
| 2015/0249411 A1* | 9/2015 | Nakamura | H02P 6/186 |
| | | | 318/400.3 |
| 2015/0321574 A1 | 11/2015 | Oi et al. | |
| 2017/0284409 A1* | 10/2017 | Kawashima | F04B 49/20 |
| 2017/0331400 A1 | 11/2017 | Saha et al. | |
| 2018/0178656 A1 | 6/2018 | Takegawa et al. | |
| 2018/0212549 A1 | 7/2018 | Yoshida | |

FOREIGN PATENT DOCUMENTS

| | | |
|---|---|---|
| JP | 2011-55582 A | 3/2011 |
| JP | 2014-100043 A | 5/2014 |
| JP | 2015-192581 A | 11/2015 |
| JP | 2015-216781 A | 12/2015 |
| JP | 2015-226433 A | 12/2015 |
| JP | 2018-107873 A | 7/2018 |
| JP | 2018-121408 A | 8/2018 |
| WO | WO 2016/104318 A1 | 6/2016 |

OTHER PUBLICATIONS

International Search Report for International Application No. PCT/JP2020/010436, dated Jun. 2, 2020, with English translation.
Written Opinion of the International Searching Authority for International Application No. PCT/JP2020/010436, dated Jun. 2, 2020, with an English translation.

* cited by examiner

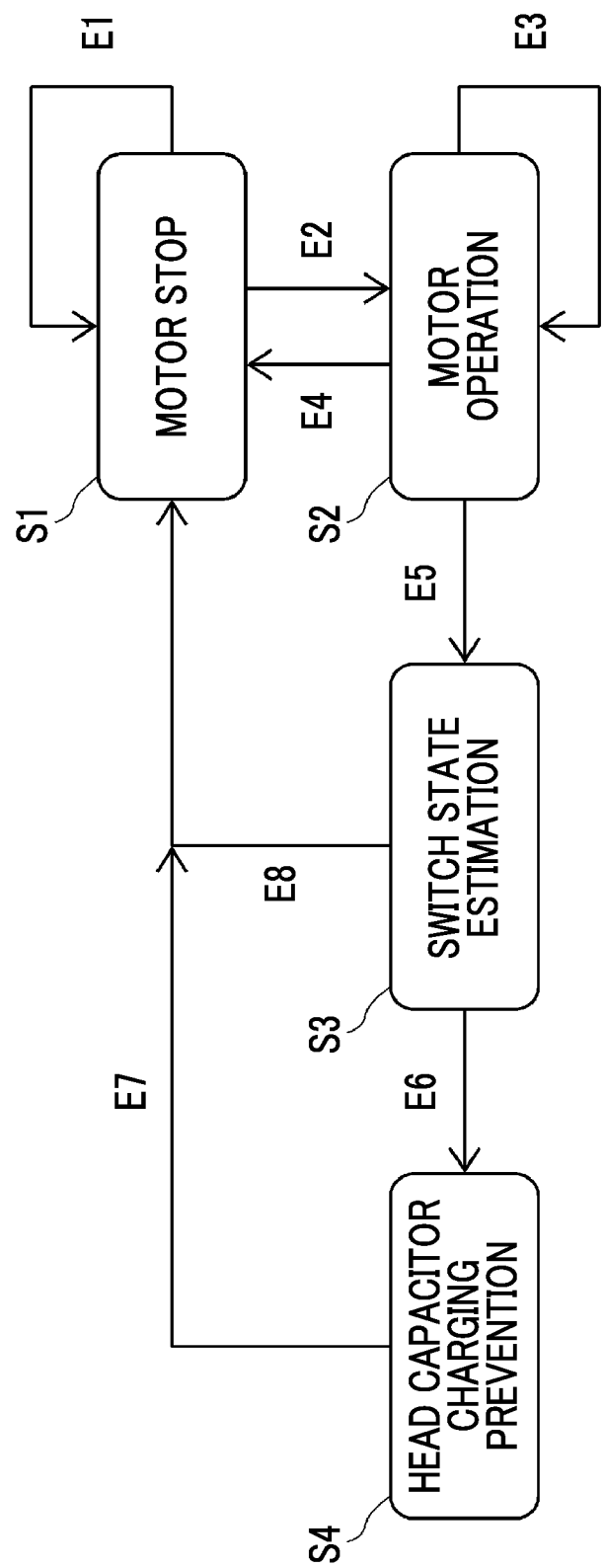

FIG. 3

| EVENT | CONTENT |
|---|---|
| E1 | MOTOR ROTATION SPEED COMMAND = 0 rps or VOLTAGE ACROSS HEAD CAPACITOR < Vx |
| E2 | MOTOR ROTATION SPEED COMMAND ≠ 0 rps and VOLTAGE ACROSS HEAD CAPACITOR ≥ Vx |
| E3 | MOTOR ROTATION SPEED COMMAND ≠ 0 rps and VOLTAGE ACROSS HEAD CAPACITOR ≥ Vx |
| E4 | MOTOR ROTATION SPEED COMMAND = 0 rps |
| E5 | VOLTAGE ACROSS HEAD CAPACITOR < Vx |
| E6 | ABSOLUTE VALUE OF SLOPE OF CHANGE IN VOLTAGE ACROSS HEAD CAPACITOR = LARGE |
| E7 | GIVEN TIME ELAPSES |
| E8 | ABSOLUTE VALUE OF SLOPE OF CHANGE IN VOLTAGE ACROSS HEAD CAPACITOR = SMALL |

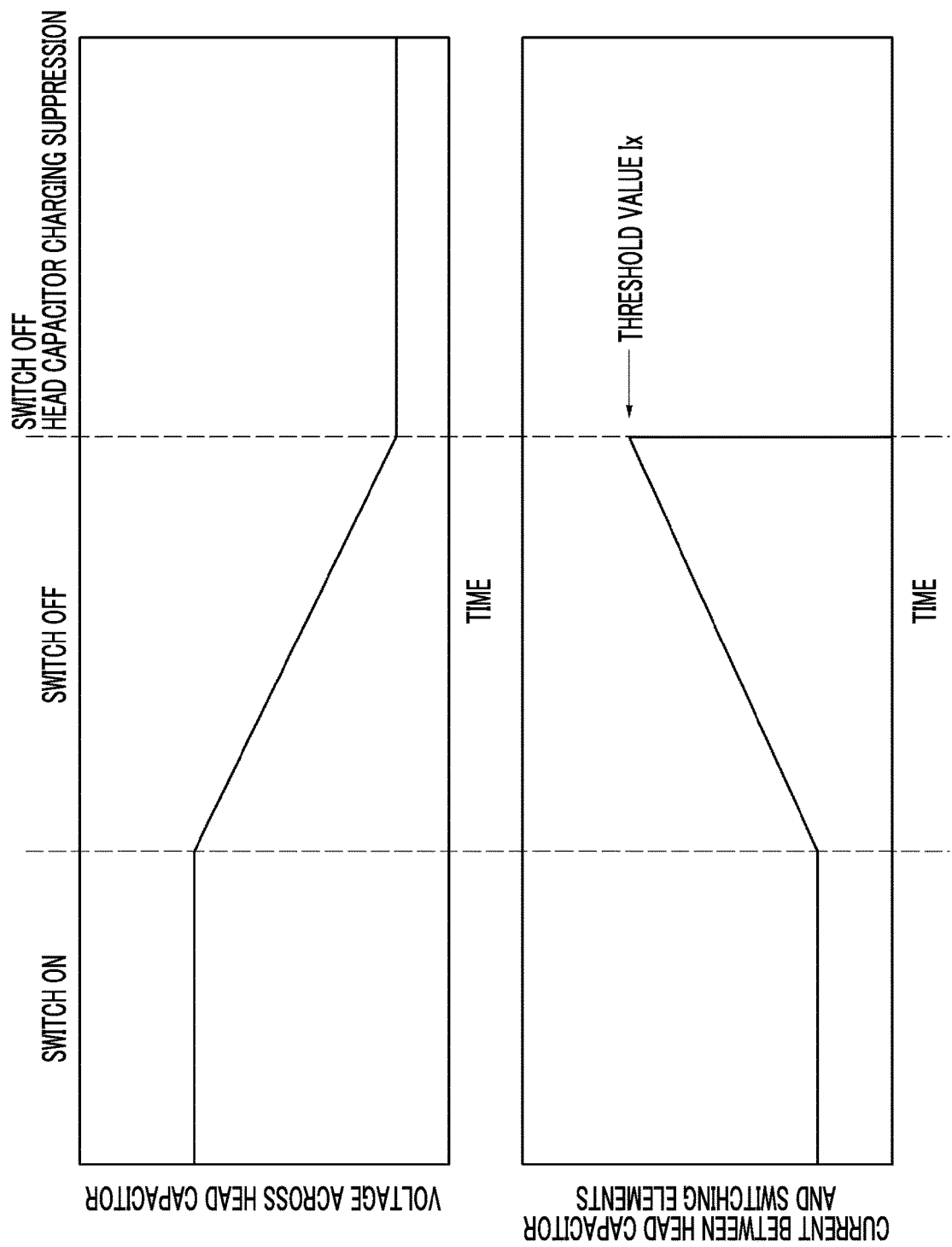

FIG. 6

| EVENT | CONTENT |
|---|---|
| E1 | MOTOR ROTATION SPEED COMMAND = 0 rps or VOLTAGE ACROSS HEAD CAPACITOR < Vx |
| E2 | MOTOR ROTATION SPEED COMMAND ≠ 0 rps and VOLTAGE ACROSS HEAD CAPACITOR ≥ Vx |
| E3 | MOTOR ROTATION SPEED COMMAND ≠ 0 rps and VOLTAGE ACROSS HEAD CAPACITOR ≥ Vx |
| E4 | MOTOR ROTATION SPEED COMMAND = 0 rps |
| E5 | CURRENT BETWEEN HEAD CAPACITOR AND SWITCHING ELEMENTS > Ix |
| E6 | ABSOLUTE VALUE OF SLOPE OF CHANGE IN CURRENT BETWEEN HEAD CAPACITOR AND SWITCHING ELEMENTS = LARGE |
| E7 | GIVEN TIME ELAPSES |
| E8 | ABSOLUTE VALUE OF SLOPE OF CHANGE IN CURRENT BETWEEN HEAD CAPACITOR AND SWITCHING ELEMENTS = SMALL |

FIG. 7

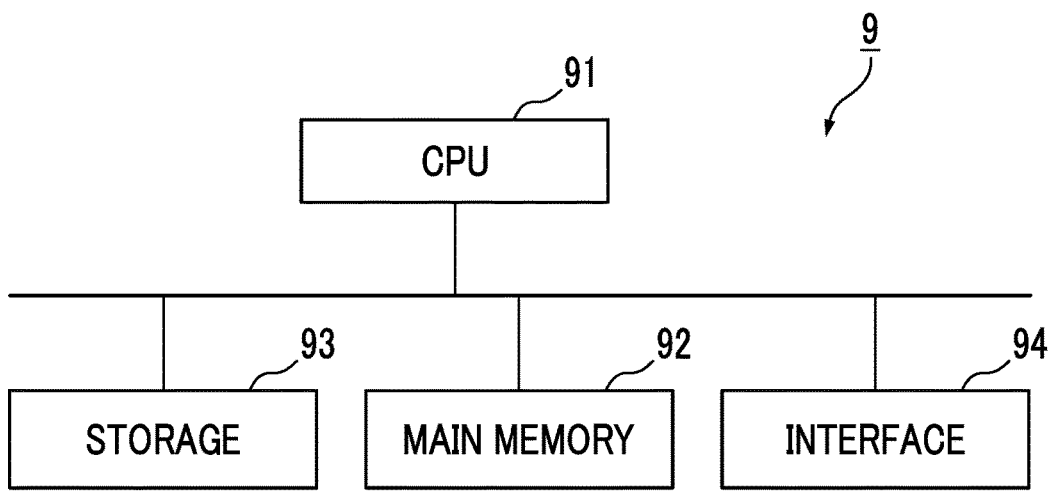

PROTECTION CONTROL UNIT FOR AN INVERTER CONTROLLING CURRENT FLOW TO A HEAD CAPACITOR

TECHNICAL FIELD

The present invention relates to a control device, an electric compressor, and a control method.

The present application claims priority based on Japanese Patent Application No. 2019-047681, filed on Mar. 14, 2019, the content of which is incorporated herein by reference.

BACKGROUND ART

An electric compressor for a vehicle as an example of a device for a vehicle using a motor is configured with a compressor that compresses a refrigerant, a motor that rotates the compressor, and an inverter that controls the motor. The inverter is equipped with a plurality of switching elements that convert a direct voltage into an alternating voltage to supply an alternating current to a stator winding of the motor, a control device that detects a current/voltage of each unit and controls the switching elements based on a result of detection, a head capacitor that is provided to suppress a surge voltage caused by the operation of the switching elements or to smooth the direct voltage, and the like (PTL 1).

The electric compressor is provided in a narrow space of a vehicle, and accordingly, a reduction in size of the electric compressor is required. To realize the reduction in size of the electric compressor, the head capacitor is also reduced in size. The capacitance of the head capacitor is correlated with a size, and thus, in a case where the head capacitor is reduced in size, the capacitance of the head capacitor necessarily decreases.

The electric compressor receives supply of a high voltage from a high voltage battery installed in the vehicle, and rotates the motor and the compressor via the inverter to compress the refrigerant (FIG. 8). FIGS. 8 to 11 are simple circuit diagrams showing a configuration example of an electric compressor 100. The electric compressor 100 shown in FIG. 8 includes a compressor 4, a motor 3 that rotates the compressor 4, and an inverter 200 that controls the motor 3. The inverter 200 includes six switching elements 201 to 206 and a head capacitor 207. The head capacitor 207 is connected to a high voltage battery 5 through a switch (contactor or the like) 6. FIG. 8 shows a flow of a current at any timing at the time of motor operation. FIG. 9 shows an example (a case where the switch 6 is on) of a flow of a current immediately after the inverter is stopped. FIG. 10 shows an example (a case where the switch 6 is off) of a flow of a current immediately after the inverter is stopped. FIG. 11 shows an example of a flow of a current immediately after the inverter is stopped.

In a case where all switching elements are brought into an off state (inverter stop state) during electric compressor operation, the motor continues to rotate only for a short time due to the inertia of the compressor and the motor itself, and a current flowing in the motor immediately before or an induced voltage due to rotation is returned to the high voltage battery through the inverter (FIG. 9). As a result, a little increase in voltage occurs in the high voltage battery.

On the other hand, the switch is provided between the electric compressor and the high voltage battery, and a vehicle-side system controls the switch. The switch may be opened in response to a command from the vehicle system during electric compressor operation, and power supply to the electric compressor may be cut off. In a case where there is no power feed from the high voltage battery, only a voltage charged in the head capacitor is supplied from the inverter to the motor. As described above, the head capacitor has a small capacity, and accordingly, a voltage across the head capacity decreases instantly. In a case where an input voltage (that is, the voltage across the head capacitor) falls below a threshold value, the control device of the electric compressor brings all switching elements into the off state. In a case where the switch 6 is closed as described above, the current flows into the high voltage battery 5 (FIG. 9); however, in a case where the switch 6 is open, the current flows into the head capacitor 207 and causes a rapid increase in voltage of the voltage across the head capacitor (FIG. 10). In a case where the increased voltage exceeds a withstand voltage of the switching element, the switching element may fail. As a means for preventing the failure, in NPL 1 or the like, a method of appropriately controlling the switching elements of the inverter to prevent the current from flowing into the head capacitor has been examined (FIG. 11).

CITATION LIST

Patent Literature

[PTL 1] Japanese Unexamined Patent Application Publication No. 2011-55582

Non Patent Literature

[NPL 1] AOKI Wataru, NAKAJIMA Yuki, ITOH Junichi, TOBA Akio, "Proposal for control method to suppress increase in DC voltage at emergency stop of inverter", 2012 Joint Conference of Electrical and Electronics Engineers in Hokuriku, A-72 (2012)

SUMMARY OF INVENTION

Technical Problem

In executing the method of appropriately controlling the switching elements of the inverter to suppress the current flowing into the head capacitor, it is desirable that the electric compressor side recognizes in advance that the switch is in the open state. However, the switch is controlled by the system on the system side. For this reason, information that the switch is open may not reach the electric compressor. Thus, in a configuration assuming that information that the switch is open is received, there is a problem in that control for suppressing a current flowing into the head capacitor may not be appropriately performed.

The invention has been made in view of the above-described situation, and an object of the invention is to provide a control device and a control method capable of solving the above-described problem.

Solution to Problem

According to a first aspect of the invention, a control device includes an electricity detection unit that detects a physical quantity of electricity pertaining to a head capacitor provided between a direct power supply and a switching element of an inverter, and a protection control unit that controls the switching element of the inverter depending on a change in physical quantity of the electricity such that no current flows to the head capacitor.

According to a second aspect of the invention, in the control device according to the first aspect, the protection control unit may control the switching element of the inverter such that no current flows to the head capacitor in a case where an absolute value of a slope of the change in physical quantity of the electricity is greater than a predetermined value.

According to a third aspect of the invention, in the control device according to the first or second aspect, the protection control unit may control the switching element of the inverter such that no current flows to the head capacitor in a case where a value of the physical quantity of the electricity satisfies a magnitude criterion and where an absolute value of a slope of the change in physical quantity of the electricity is greater than a predetermined value.

According to a fourth aspect of the invention, the control device according to any one of the first to third aspects may further include a motor stop control unit that turns off all switching elements of the inverter when a predetermined time elapses in a state in which the switching element of the inverter is controlled such that no current flows to the head capacitor.

According to a fifth aspect of the invention, in the control device according to any one of the first to fourth aspects, the inverter may be a drive circuit of a motor, and the head capacitor may be connected to the direct power supply through a switch that is turned on or off by an external device.

According to a sixth aspect of the invention, an electric compressor includes a compressor, a motor that drives the compressor, an inverter that drives the motor, a head capacitor that is provided between a direct power supply and a switching element of the inverter, an electricity detection unit that detects a physical quantity of electricity pertaining to the head capacitor, and a protection control unit that controls the switching element of the inverter depending on a change in physical quantity of the electricity such that no current flows to the head capacitor.

According to a seventh aspect of the invention, a control method includes, in a control device including an electricity detection unit that detects a physical quantity of electricity pertaining to a head capacitor provided between a direct power supply and a switching element of the inverter and a protection control unit that controls the switching element of the inverter, at the protection control unit, controlling the switching element of the inverter depending on a change in physical quantity of the electricity such that no current flows to the head capacitor.

Advantageous Effects of Invention

According to at least one aspect described above, even if information that the switch is open is not received, it is possible to appropriately perform control for suppressing a current flowing into a head capacitor.

BRIEF DESCRIPTION OF DRAWINGS

FIG. 2 is a state transition diagram illustrating an operation example of an electric compressor 1 shown in FIG. 1.

FIG. 3 is a chart showing an example of contents of events E1 to E8 shown in FIG. 2.

FIG. 5 is a schematic view illustrating an operation example of another embodiment of the invention.

FIG. 6 is a chart showing another example of contents of events E1 to E8 shown in FIG. 2.

FIG. 7 is a schematic block diagram showing the configuration of a computer according to at least one embodiment.

DESCRIPTION OF EMBODIMENTS

Figure 1:
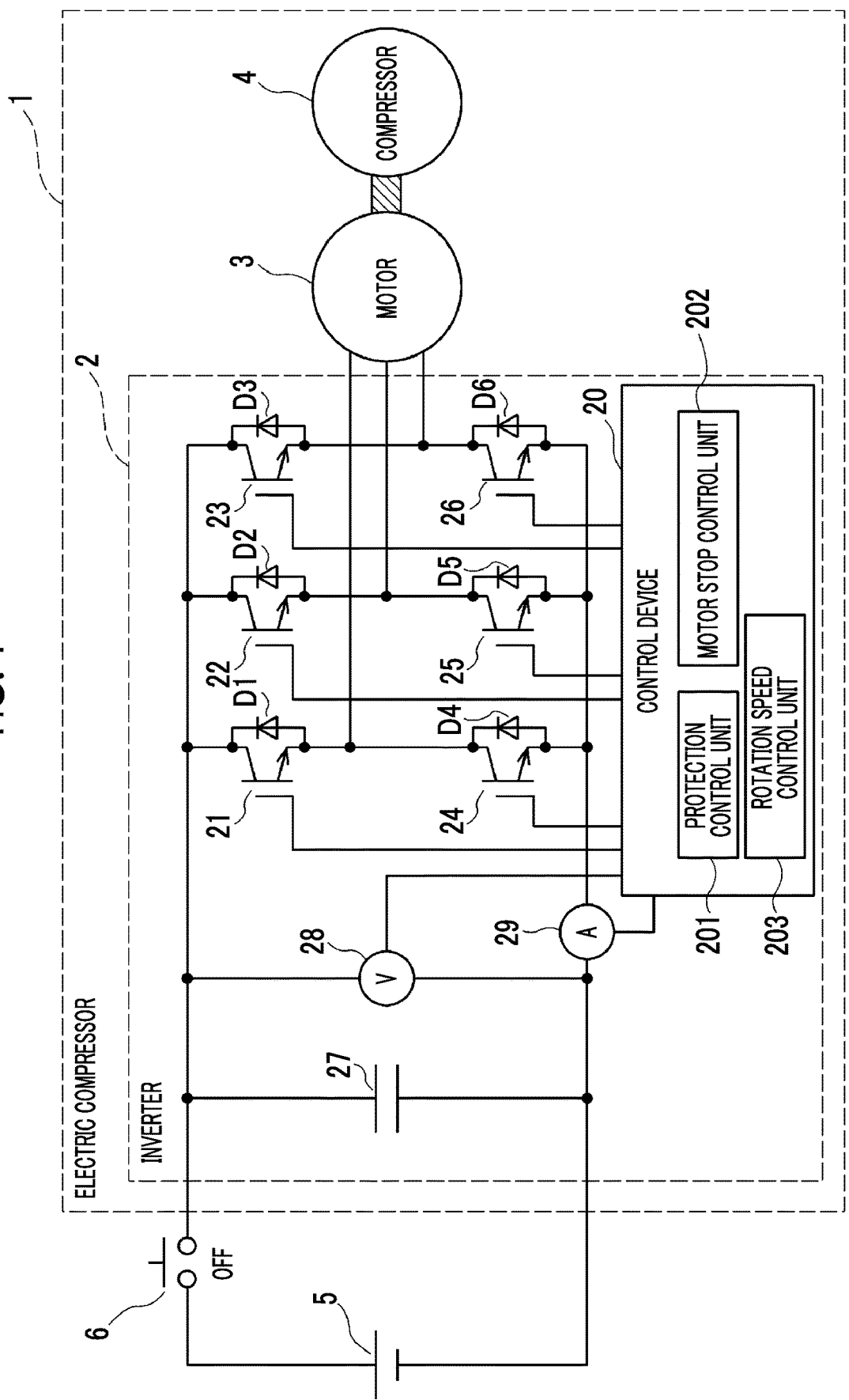
FIG. 1 is a simple circuit diagram illustrating a configuration example of an electric compressor according to an embodiment of the invention.

Hereinafter, embodiments of the invention will be described with reference to the drawings. The same or corresponding configurations in the drawings are represented by the same reference numerals, and description thereof will not be repeated.

First Embodiment

FIG. 1 is a simple circuit diagram showing a configuration example of an electric compressor 1 according to a first embodiment of the invention. The electric compressor 1 shown in FIG. 1 includes an inverter 2, a motor 3, and a compressor 4. The compressor 4 compresses a refrigerant. The motor 3 rotates the compressor 4. The inverter 2 is a drive circuit of the motor 3 and controls the motor 3.

The inverter 2 has a plurality of switching elements 21 to 26 that convert a direct voltage into an alternating voltage to supply an alternating current to a stator winding of the motor 3, and a plurality of free wheel diodes D1 to D6 connected in parallel to the switching elements 21 to 26, respectively. The inverter 2 has a control device 20, a head capacitor 27, a voltage detection unit 28 or a current detection unit 29 that detect a voltage or a current of each unit, and the like. In this case, the head capacitor 27 suppresses a surge voltage caused by the operation of the switching elements to 26 or smooths a direct voltage of a direct power supply that is a drive power supply of the motor 3. The voltage detection unit 28 detects a voltage across the head capacitor 27. The current detection unit 29 detects a current that flows between a plurality of switching elements 21 to 26 and the free wheel diodes D1 to D6, and the head capacitor 27. Then, the control device 20 controls the switching elements 21 to 26 based on a command value of a rotation speed of the motor 3 instructed by a vehicle-side system (external device) and detection results of the voltage detection unit 28 and the current detection unit 29.

The control device 20 has, for example, a central processing unit (CPU), a storage device, an input/output device, and the like, and operates as the CPU executes a program stored in the storage device. The control device 20 includes a protection control unit 201, a motor stop control unit 202, and a rotation speed control unit 203 as functional constituent elements configured with a combination of hardware of the control device 20 and software, such as the program executed by the CPU.

The protection control unit 201 estimates whether or not the switch 6 is off depending on a change (change in physical quantity of electricity) in voltage or current detected by the voltage detection unit 28 or the current detection unit 29, and controls the switching elements 21 to 26 such that no current flows to the head capacitor 27 in a case where the switch 6 is estimated to be off. The protection control unit 201 estimates that the switch 6 is off, for example, in a case where an absolute value of a slope of the change (change in physical quantity of electricity) in voltage or current detected by the voltage detection unit 28 or the current detection unit 29 is greater than a predetermined value, and controls the switching elements 21 to 26 such that no current flows to the head capacitor 27. The protection control unit 201 prevents a current, such as a regenerative current of the motor 3, from flowing into the head capacitor 27, for example, by turning off all three switching elements 21 to 23 on an upper side and by turning on all three switching elements 24 to 26 on a lower side. Alternatively, the protection control unit 201 prevents the regenerative current of the motor 3, or the like from flowing into the head capacitor 27, for example, by turning on all three switching elements 21 to 23 on the upper side and by turning off all three switching elements 24 to 26 on the lower side.

The motor stop control unit 202 turns off all the switching elements 21 to 26 when a given time elapses in a state in which the protection control unit 201 controls the switching elements 21 to 26 such that no current flows to the head capacitor 27. The given time is a time required until the rotation speed of the motor 3 that is rotated by inertia sufficiently decreases and is brought into a state in which no current flows to the head capacitor 27 (or a state where a current barely flows).

The rotation speed control unit 203 controls the rotation speed of the motor 3 by controlling the switching elements 21 to 26 based on the command value (hereinafter, referred to as a motor rotation speed command) of the rotation speed of the motor 3 instructed by the vehicle-side system.

In an example shown in FIG. 1, the head capacitor 27 is connected to a high voltage battery 5 as a direct power supply through a switch (contactor, electromagnetic contactor, electromagnetic switch, relay, or the like) 6. In the configuration shown in FIG. 1, the voltage detection unit 28 and the current detection unit 29 are an example of an electricity detection unit that detects a physical quantity of electricity pertaining to the head capacitor 27 provided between the high voltage battery 5 (direct power supply) and the inverter 2.

Next, an operation example of the electric compressor 1 shown in FIG. 1 will be described with reference to FIGS. 1 to 3. FIG. 2 is a state transition diagram illustrating the operation example of the electric compressor 1 shown in FIG. 1. FIG. 3 is a chart showing an example of contents of events E1 to E8 shown in FIG. 2.

As shown in FIG. 2, the electric compressor 1 of the embodiment operates in any of four states of a motor stop state S1, a motor operation state S2, a switch state estimation state S3, and a head capacitor charging prevention state S4. An initial state is the motor stop state S1. The states S1 to S4 transition depending on the events E1 to E8 shown in FIG. 3.

The motor stop state S1 is an operation state in which the rotation speed control unit 203 or the motor stop control unit 202 turns off all the switching elements 21 to 26 of the inverter 2. The motor operation state S2 is an operation state in which the rotation speed control unit 203 controls the on and off of the switching elements to 26 of the inverter 2 based on the motor rotation speed command to operate the motor 3. The switch state estimation state S3 is an operation state in which the protection control unit 201 estimates whether the switch 6 is on or off based on the detection result of the voltage detection unit 28 (or the current detection unit 29). The head capacitor charging prevention state S4 is an operation state in which the protection control unit 201 controls the switching elements 21 to 26 such that no current flows to the head capacitor 27.

In a case where the event E1 occurs in the motor stop state S1, the electric compressor 1 is maintained in the motor stop state S1. In a case where the event E2 occurs in the motor stop state S1, the electric compressor 1 transitions to the motor operation state S2. In a case where the event E3 occurs in the motor operation state S2, the electric compressor 1 is maintained in the motor operation state S2. In a case where the event E4 occurs in the motor operation state S2, the electric compressor 1 transitions to the motor stop state S1. In a case where the event E5 occurs in the motor operation state S2, the electric compressor 1 transitions to the switch state estimation state S3. In a case where the event E6 occurs in the switch state estimation state S3, transition is made to the head capacitor charging prevention state S4. In a case where the event E7 occurs in the head capacitor charging prevention state S4, transition is made to the motor stop state S1. In a case where the event E8 occurs in the switch state estimation state S3, transition is made to the motor stop state S1.

The contents of the events E1 to E8 are as shown in FIG. 3. The event E1 is an event where the motor rotation speed command is 0 rotations per second (rps) or the voltage across the head capacitor is smaller than a predetermined threshold value Vx. The event E2 is an event where the motor rotation speed command is not 0 rps and the voltage across the head capacitor is equal to or greater than the threshold value Vx. The event E3 is an event where the motor rotation speed command is not 0 rps and the voltage across the head capacitor is equal to or greater than the threshold value Vx. The event E4 is an event where the motor rotation speed command is 0 rps. The event E5 is an event where the voltage across the head capacitor is smaller than the threshold value Vx. The event E6 is an event where the absolute value of the slope of the change in voltage across the head capacitor is greater than a predetermined threshold value. The event E7 is an event where the given time elapses. The event E8 is an event where the absolute value of the slope of the change in voltage across the head capacitor is smaller than the predetermined threshold value.

For example, in the motor stop state S1, in a case where the motor rotation speed command of not 0 rps is input and the voltage across the head capacitor is equal to or greater than the threshold value Vx (the event E2 occurs), the rotation speed control unit 203 controls the on and off of the switching elements 21 to 26 of the inverter 2 based on the motor rotation speed command to operate the motor 3 (motor operation state S2). In the motor operation state S2, in a case where the motor rotation speed command is 0 rps (the event E4 occurs), the rotation speed control unit 203 turns off the switching elements 21 to 26 of the inverter 2 to stop the motor 3 (motor stop state S1).

Figure 4:
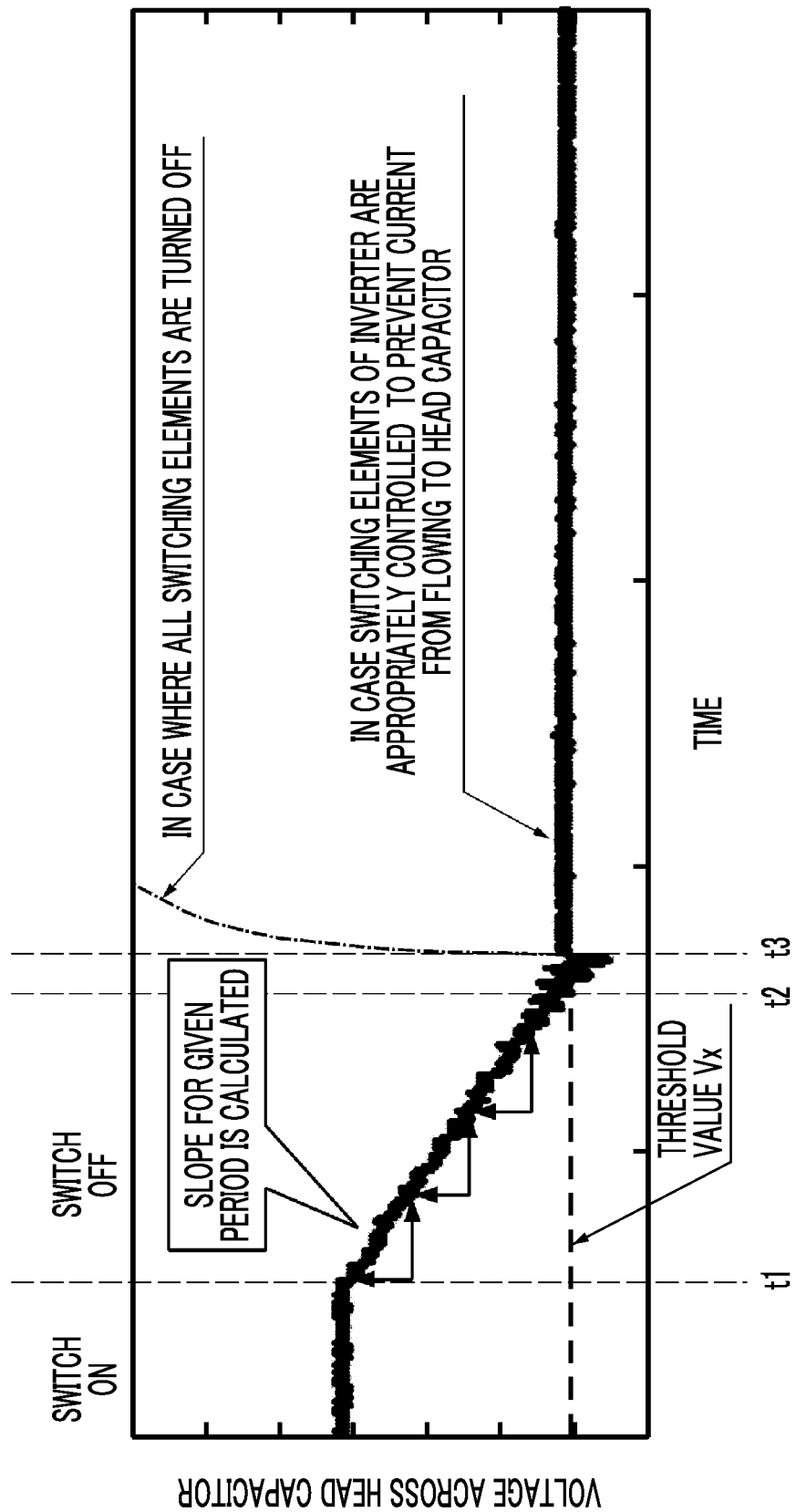
FIG. 4 is a diagram showing an example of a measurement result of change over time of a voltage across a head capacitor 27 shown in FIG. 1.
Figure 8:
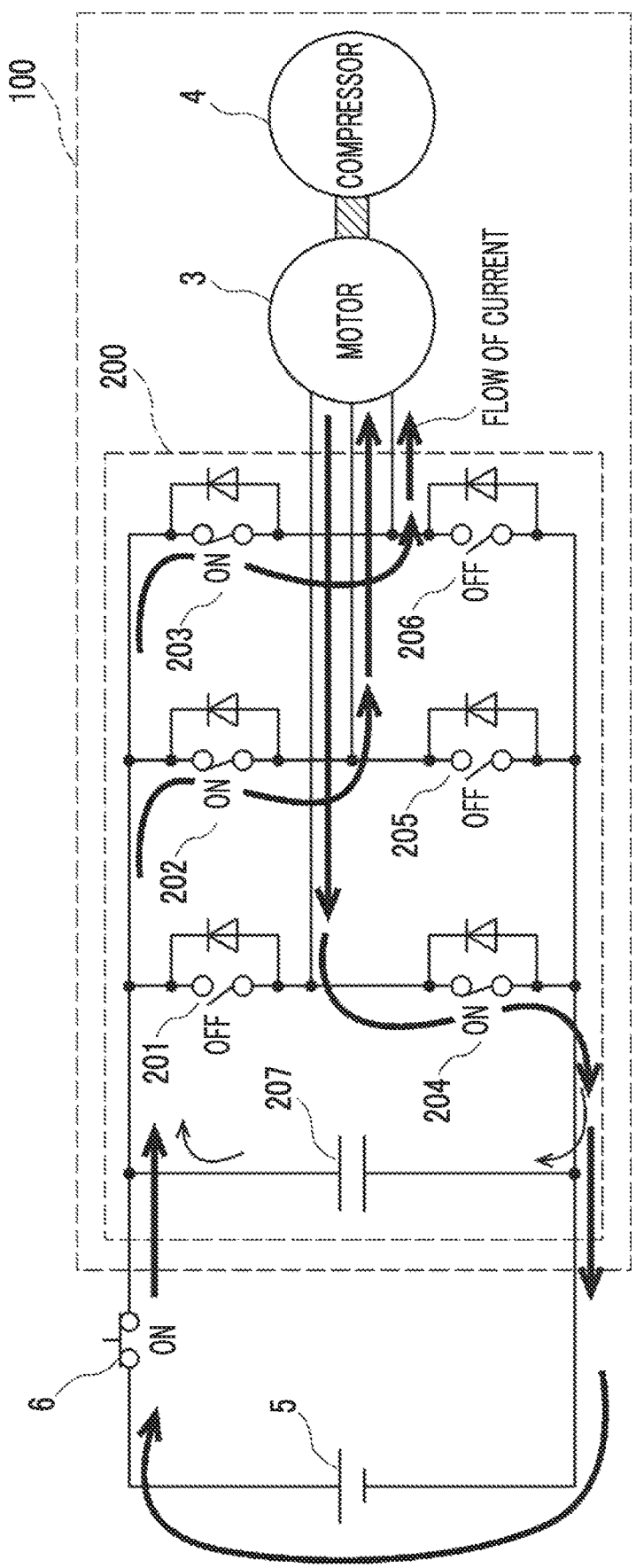
FIG. 8 is a schematic view showing an operation example of an electric compressor.
Figure 9:
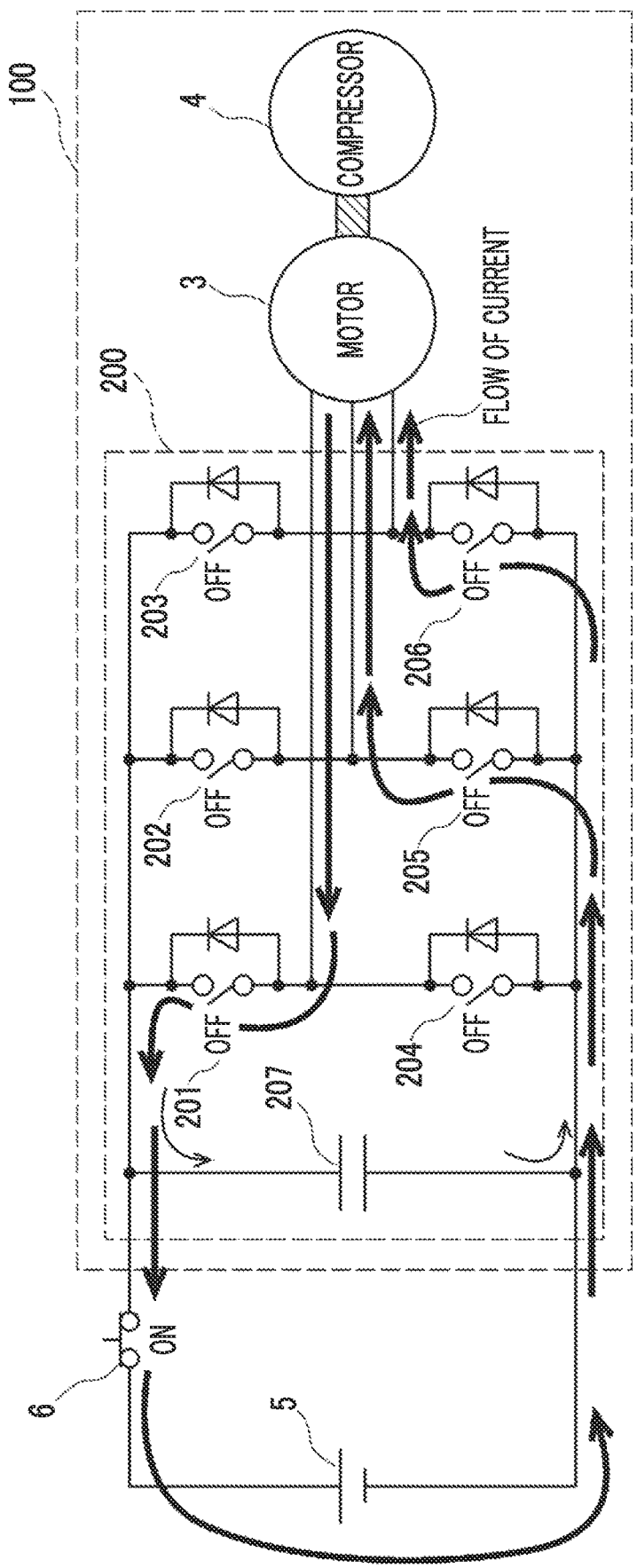
FIG. 9 is a schematic view showing an operation example of the electric compressor.
Figure 10:
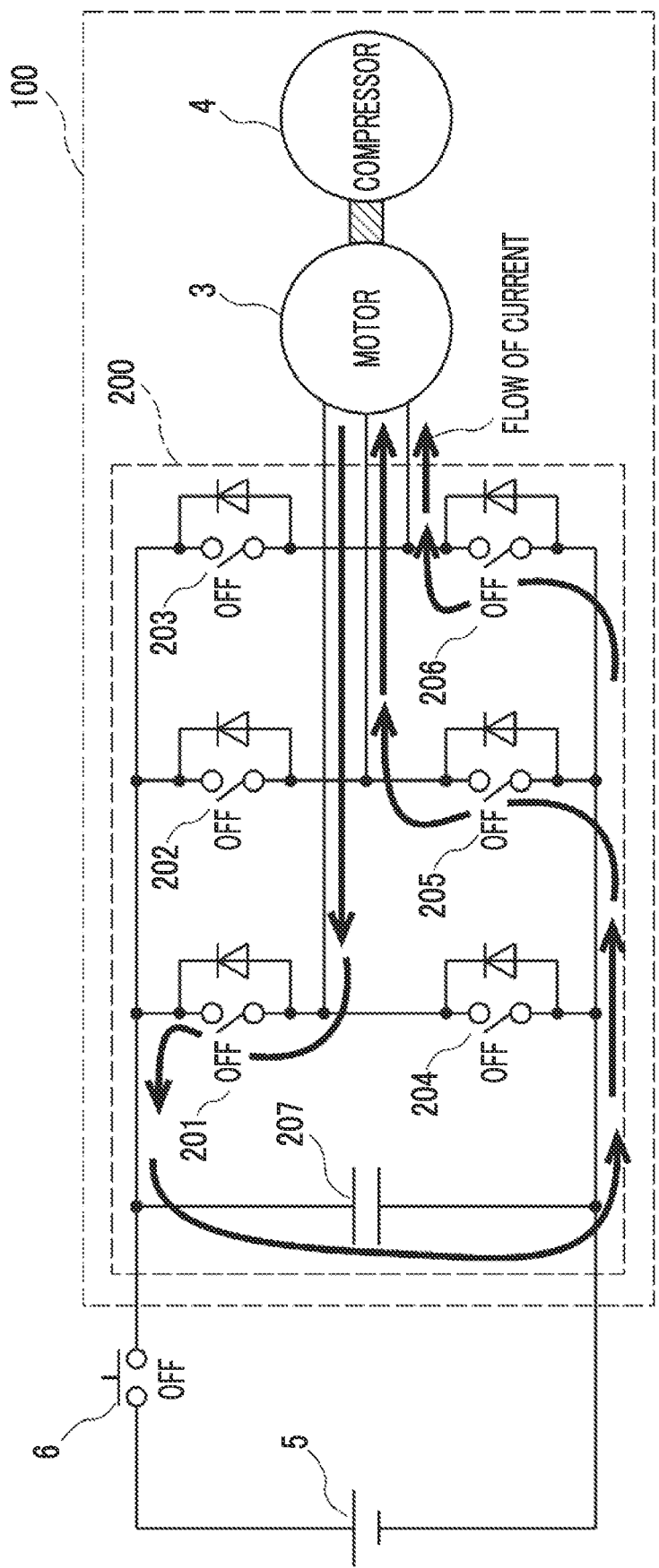
FIG. 10 is a schematic view showing an operation example of the electric compressor.
Figure 11:
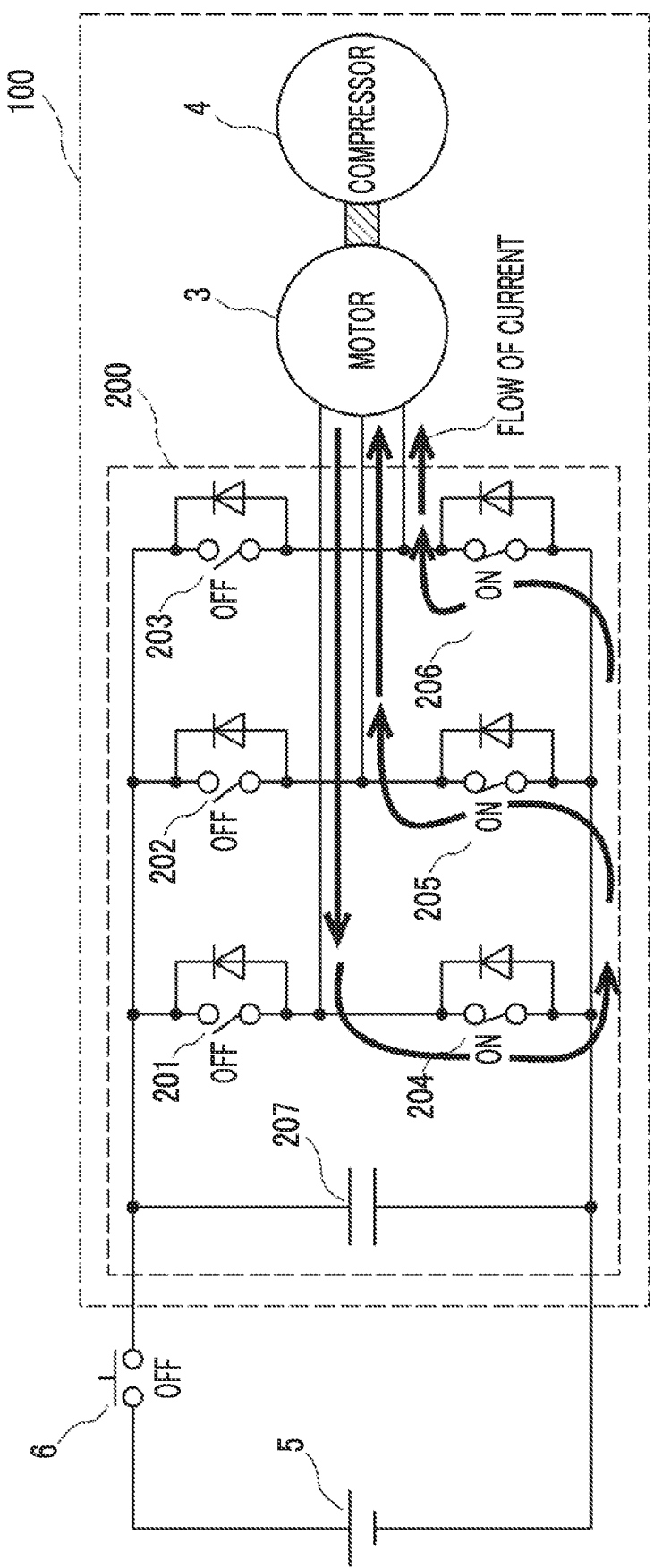
FIG. 11 is a schematic view showing an operation example of the electric compressor.

In the motor operation state S2, in a case where the voltage across the head capacitor is smaller than the threshold value Vx (the event E5 occurs), the protection control unit 201 estimates whether the switch 6 is on or off based on the voltage across the head capacitor detected by the voltage detection unit 28 (switch state estimation state S3). Here, an example of change over time of the voltage across the head capacitor 27 after the switch 6 is turned off will be described with reference to FIG. 4. FIG. 4 is a diagram showing an example of a measurement result of change over time of the voltage across the head capacitor 27 shown in FIG. 1. In the example shown in FIG. 4, the switch 6 is switched from on to off at a time t1, the voltage across the head capacitor is smaller than the threshold value Vx at a time t2, and the switching elements 21 to 26 are controlled by the protection control unit 201 at a time t3 such that no current flows to the head capacitor 27.

In the example shown in FIG. 4, before the time t2, the electric compressor 1 operates in the motor operation state S2. Then, when the voltage across the head capacitor 27 is smaller than the threshold value Vx at the time t2, the electric compressor 1 transitions from the motor operation state S2 to the switch state estimation state S3. In a case where transition is made to the switch state estimation state S3, the protection control unit 201 calculates the absolute value (in this case, a voltage decrease amount per unit time) of the slope of the change in voltage across the head capacitor 27 for a given period before the time t2. In this case, the protection control unit 201 calculates the absolute value of the slope for a predetermined period multiple times (in the example of FIG. 4, three times) as shown in FIG. 4, for example. Then, in a case where all the absolute values of the slopes for multiple times are greater than the predetermined threshold value (or in a case where the absolute values of the slopes for two times or more are greater than the predetermined threshold value), the protection control unit 201 estimates that the switch 6 is turned off, determines that the event E6 occurs, and controls the switching elements 21 to 26 such that no current flows to the head capacitor 27 (head capacitor charging prevention state S4) (time t3). After the time t3, since no current flows to the head capacitor 27, the voltage across the head capacitor 27 has a given value and is not changed. Then, after transition is made to the head capacitor charging prevention state S4 at the time t3, when the given time elapses (event E7), the motor stop control unit 202 turns off all the switching elements 21 to 26 (motor stop state S1). As shown by a chain line in FIG. 4, in a case where all the switching elements 21 to 26 are turned off at the time t2, the voltage across the head capacitor 27 rapidly increases.

In FIG. 2, in the switch state estimation state S3, in a case where the absolute value (in this case, a voltage decrease amount per unit time) of the slope of the change in voltage across the head capacitor 27 for a given period before the occurrence of the event E5 is smaller than the predetermined threshold value (corresponding to the event E8), the protection control unit 201 transitions the operation state to the motor stop state S1 without passing through the head capacitor charging prevention state S4, and makes the motor stop control unit 202 turn off all the switching elements 21 to 26 (motor stop state S1). In a case where the absolute value of the slope of the change in voltage across the head capacitor 27 for the given period before the occurrence of the event E5 is smaller than the predetermined threshold value, the switch is not turned off, and estimation is made that the voltage of the high voltage battery 5 decreases. In a case where the switch 6 is on and the high voltage battery 5 is connected, even though all the switching elements 21 to 26 are turned off, the regenerative current of the motor 3 also flows into the high voltage battery 5, and thus, the voltage across the head capacitor 27 does not rapidly increase. On the other hand, in the head capacitor charging prevention state S4, a short-circuit current caused by regenerative power generated by the motor 3 flows in a part of the switching elements 21 to 26, and accordingly, a comparatively large burden is imposed on a part of the switching elements 21 to 26. Accordingly, when the event E8 occurs, the operation state of the electric compressor 1 transitions to the motor stop state S1 without passing through the head capacitor charging prevention state S4.

In the first embodiment, the open/closed state of the switch 6 is determined by monitoring the change in voltage across the head capacitor 27. In a case where the switch 6 is open during the operation of the electric compressor 1, the electric compressor 1 continues to operate with a voltage charged in the head capacitor 27. The head capacitor 27 has a small capacity, and the voltage across the head capacitor 27 continues to rapidly decrease as shown in FIG. 4. On the other hand, the voltage of the high voltage battery 5 also decreases due to driving of the vehicle, and accordingly, the voltage across the head capacitor 27 may decrease. However, the decrease in voltage of the high voltage battery 5 due to driving of the vehicle is sufficiently slower than the rapid decrease in voltage across the head capacitor 27 in a case where the switch 6 is open. With the use of this difference, the electric compressor 1 can discriminate between a voltage decrease in a state in which the switch 6 is closed and a voltage decrease in a state in which the switch 6 is open. With the use of this characteristic, in the first embodiment, in a case where the absolute value of the slope of the change in voltage across the head capacitor is large and the voltage across the head capacitor falls below the threshold value Vx, determination is made that the switch 6 is brought into an open state.

In the first embodiment, in a case where determination is made that the switch 6 is open, the switching elements 21 to 26 are controlled such that charging of the head capacitor 27 is suppressed for a short time until an inertial operation of the motor 3 is stopped. On the contrary, in a case where the absolute value of the slope of the change in voltage across the head capacitor is small and the voltage across the head capacitor falls below the threshold value Vx, determination is made that the voltage of the high voltage battery 5 decreases with the switch 6 closed.

The threshold value of the absolute value of the slope of the change in voltage across the head capacitor can be determined in advance by an experiment. Thereafter, in a case where the voltage across the head capacitor exceeds the threshold value Vx, determination can be made that the switch 6 is closed.

According to the first embodiment, it is possible to estimate the open/closed state of the switch 6 without receiving information regarding the switch 6 from the vehicle side. It is also possible to estimate the open/closed state of the switch 6 without adding a component to an existing product, for example.

Second Embodiment

Next, a second embodiment of the invention will be described with reference to FIGS. 5 and 6. FIG. 5 is a schematic view illustrating an operation example of the second embodiment. FIG. 6 is a chart showing an example of contents of the events shown in FIG. 2 in the second embodiment.

The configuration of an electric compressor of the second embodiment is the same as the configuration of the electric compressor 1 of the first embodiment shown in FIG. 1. A state transition diagram of the electric compressor of the second embodiment is the same as the state transition diagram of the electric compressor 1 of the first embodiment shown in FIG. 2. Note that a part of the contents of the events E1 to E8 in the state transition diagram shown in FIG. 2 is different between the first embodiment and the second embodiment.

FIG. 5 schematically shows change over time of the voltage across the head capacitor detected by the voltage detection unit 28 and the current detected by the current detection unit 29 in a case where the switch 6 is changed from on to off. In a case where the switch 6 is open during the operation of the electric compressor 1 (turned off), the voltage across the head capacitor rapidly decreases, but conversely, the current flowing between the switching elements 21 to 26 and the head capacitor 27 rapidly increases. The current flowing in the head capacitor 27 can be detected by the current detection unit 29 provided between the switching elements 21 to 26 and the head capacitor 27 in a case where the switch 6 is open. In the second embodiment, this operation is used, and the open/closed state of the switch 6 is estimated based on the magnitude of the head capacitor current and an absolute value of a slope of change in head capacitor current instead of the change in voltage of the first embodiment.

As shown in FIG. 6, in the second embodiment, the contents of the events E5, E6, and E8 shown in FIG. 2 are changed as follows compared to the first embodiment. That is, the event E5 of the second embodiment is an event where the current between the head capacitor and the switching element is greater than a threshold value Ix. The event E6 of the second embodiment is an event where an absolute value of a slope of change in current between the head capacitor and the switching element is greater than a predetermined threshold value. Then, the event E8 of the second embodiment is an event where the absolute value of the slope of the change in current between the head capacitor and the switching element is smaller than the predetermined threshold value.

According to the second embodiment, as in the first embodiment, it is possible to estimate the open/closed state of the switch 6 without receiving information regarding the switch 6 from the vehicle side. It is also possible to estimate the open/closed state of the switch 6 without adding a component.

In the first embodiment and the second embodiment, for example, the slope of the change in voltage or current may be monitored regularly without depending on the comparison result of the magnitude of the voltage or the current with the predetermined threshold value Vx or Ix, and in a case where the absolute value of the slope of the change exceeds a predetermined threshold value, estimation may be made that the switch 6 is brought into the open state. In this case, to avoid erroneous estimation due to an influence of noise or the like, for example, it is desirable that the comparison of the absolute value of the slope of the change with the predetermined threshold value is performed multiple times (for example, three times or more), and in a case where a predetermined comparison result is obtained multiple times, estimation is made that the switch 6 is in the open state.

As described above, the control device 20 in each embodiment of the invention includes the voltage detection unit 28 or the current detection unit 29 (electricity detection unit) that detects the voltage or the current (physical quantity of electricity) pertaining to the head capacitor 27 provided between the high voltage battery 5 (direct power supply) and the switching elements 21 to 26 of the inverter 2, and the protection control unit 201 that controls the switching elements 21 to 26 of the inverter 2 depending on the change in voltage or current (physical quantity of electricity) such that no current flows to the head capacitor 27. According to this configuration, even in a case where information that the switch 6 is open does not reach the electric compressor 1, it is possible to appropriately perform control for suppressing the current flowing into the head capacitor 27.

The protection control unit 201 controls the switching elements 21 to 26 of the inverter 2 such that no current flows to the head capacitor 27 in a case where the absolute value of the slope of the change in voltage or current (physical quantity of electricity) is greater than the predetermined value. The protection control unit 201 controls the switching elements 21 to 26 of the inverter 2 such that no current flows to the head capacitor 27 in a case where the value of the voltage or current (physical quantity of electricity) satisfies a magnitude criterion and where the absolute value of the slope of the change in voltage or current (physical quantity of electricity) is greater than the predetermined value. The control device 20 turns off all the switching elements 21 to 26 of the inverter 2 when a predetermined time elapses in a state in which the switching elements 21 to 26 of the inverter 2 are controlled such that no current flows to the head capacitor 27. The inverter 2 is a drive circuit of the motor, and the head capacitor 27 is connected to the high voltage battery 5 (direct power supply) through the switch 6 that is turned on or off by the external device.

Although the embodiments of the invention have been described above with reference to the drawings, a specific configuration is not limited to the above-described embodiments, and design changes without departing from the spirit and scope of the invention are included.

<Computer Configuration>

FIG. 7 is a schematic block diagram showing the configuration of a computer according to at least one embodiment.

A computer 90 includes a processor 91, a main memory 92, a storage 93, and an interface 94.

The above-described control device 20 is mounted on the computer 90. Then, the operation of each processing unit described above is stored in the storage 93 in a format of a program. The processor 91 reads the program from the storage 93, develops the program in the main memory 92, and executes the above-described processing in compliance with the program. The processor 91 secures a storage area corresponding to each storage unit described above in the main memory 92 in compliance with the program.

The program may be for realizing a part of the functions that the computer 90 performs. For example, the program may perform a function in combination with another program already stored in the storage or in combination with another program installed in another device. In other embodiments, the computer may include a custom large scale integrated circuit (LSI), such as a programmable logic device (PLD), in addition to the above-described configuration or instead of the above-described configuration. Examples of the PLD include a programmable array logic (PAL), a generic array logic (GAL), a complex programmable logic device (CPLD), and a field programmable gate array (FPGA). In this case, some or all of the functions realized by the processor may be realized by the integrated circuit.

Examples of the storage 93 include a hard disk drive (HDD), a solid state drive (SSD), a magnetic disk, a magneto-optical disk, a compact disc read only memory (CD-ROM), a digital versatile disc read only memory (DVD-ROM), and a semiconductor memory. The storage 93 may be an internal medium directly connected to a bus of the computer 90 or may be an external medium connected to the computer 90 through the interface 94 or a communication line. In a case where the program is distributed to the computer 90 through the communication line, the computer 90 that receives the distributed program may develop the program in the main memory 92 and may execute the above-described processing. In at least one embodiment, the storage 93 is a non-transitory tangible storage medium.

INDUSTRIAL APPLICABILITY

With the control device, even if information that the switch is open is not received, it is possible to appropriately perform control for suppressing the current flowing into the head capacitor.

REFERENCE SIGNS LIST

- 1 electric compressor
- 2 inverter
- 3 motor
- 4 compressor
- 5 high voltage battery
- 6 switch
- 20 control device
- 21 to 26 switching element
- 27 head capacitor
- 28 voltage detection unit
- 29 current detection unit
- 201 protection control unit
- 202 motor stop control unit
- 203 rotation speed control unit

The invention claimed is:

1. A control device comprising:
  an electricity detection unit that detects a physical quantity of electricity pertaining to a head capacitor provided between a direct power supply and switching elements of an inverter; and
  a protection control unit configured to control the switching elements of the inverter such that no current flows to the head capacitor in response to a value of the physical quantity of the electricity being smaller than a magnitude criterion and where a decrease rate of physical quantity of the electricity is greater than a predetermined value and a motor, whose drive circuit is the inverter, operates,
  wherein the protection control unit is further configured to in response to the value of the physical quantity of the electricity being smaller than the magnitude criterion, determine an absolute value of a slope of a change in physical quantity of the electricity and determine if the absolute value of the slope is greater than a predetermined value to determine that the decrease rate in physical quantity of the electricity is greater than the predetermined value and in response to the value of the physical quantity of the electricity not being smaller than the magnitude criterion, not determine the absolute value of the slope of the change in physical quantity of the electricity.

2. The control device according to claim 1, further comprising:
  a motor stop control unit that turns off all of the switching elements of the inverter when a predetermined time elapses in a state in which the switching elements of the inverter is controlled such that no current flows to the head capacitor.

3. The control device according to claim 2,
  wherein the head capacitor is connected to the direct power supply through a switch that is turned on or off by an external device.

4. The control device according to claim 1,
  wherein the head capacitor is connected to the direct power supply through a switch that is turned on or off by an external device.

5. An electric compressor comprising:
  a compressor;
  a motor that drives the compressor;
  an inverter that drives the motor;
  a head capacitor that is provided between a direct power supply and switching elements of the inverter;
  an electricity detection unit that detects a physical quantity of electricity pertaining to the head capacitor; and
  a protection control unit configured to control the switching elements of the inverter such that no current flows to the head capacitor in response to a value of the physical quantity of the electricity being smaller than a magnitude criterion and where a decrease rate of physical quantity of the electricity is greater than a predetermined value and a motor, whose drive circuit is the inverter, operates,
  wherein the protection control unit is further configured to in response to the value of the physical quantity of the electricity being smaller than the magnitude criterion, determine an absolute value of a slope of a change in physical quantity of the electricity and determine if the absolute value of the slope is greater than a predetermined value to determine that the decrease rate in physical quantity of the electricity is greater than the predetermined value and in response to the value of the physical quantity of the electricity not being smaller than the magnitude criterion, not determine the absolute value of the slope of the change in physical quantity of the electricity.

6. A control method in a control device including an electricity detection unit that detects a physical quantity of electricity pertaining to a head capacitor provided between a direct power supply and switching elements of an inverter, and
  a protection control unit that controls the switching elements of the inverter, the method comprising:
  at the protection control unit, controlling the switching elements of the inverter such that no current flows to the head capacitor in response to a value of the physical quantity of the electricity being smaller than a magnitude criterion and where a decrease rate in physical quantity of the electricity is greater than a predetermined value and a motor, whose drive circuit is the inverter, operates,
  wherein the protection control unit is further configured to in response to the value of the physical quantity of the electricity being smaller than the magnitude criterion, determine an absolute value of a slope of a change in physical quantity of the electricity and determine if the absolute value of the slope is greater than a predetermined value to determine that the decrease rate in physical quantity of the electricity is greater than the predetermined value and in response to the value of the physical quantity of the electricity not being smaller than the magnitude criterion, not determine the absolute value of the slope of the change in physical quantity of the electricity.

* * * * *